Patented Nov. 13, 1945

2,389,026

UNITED STATES PATENT OFFICE 2,389,026

METHOD OF PREPARING TITANIUM DIOXIDE

Winfred J. Cauwenberg, Piney River, and Charles A. Tanner, Jr., Amherst, Va., assignors, by mesne assignments, to American Cyanamid Company, a corporation of Maine No Drawing. Application November 20, 1942, Serial No. 466,338

8 Claims. (Cl. 23—202)

This invention relates to the preparation of rutile titanium dioxide by the calcination of an anatase precipitate under controlled conditions, and aims to provide novel and unusually effective seeds for such purposes, and novel methods of preparing such seeds.

Titanium dioxide, within the thirty years since its introduction as a pigment, has made such rapid strides that it has become the outstanding white pigment used in the coating and allied industries; this popularity is due mainly to its whiteness, stability, high hiding power, high tinting strength, and ready dispersibility in vehicles. It is prepared largely by the hydrolysis, under carefully controlled conditions, of titanium sulfate solutions containing iron, prepared by digestion of ilmenite (a native ferrous titanate) with sulfuric acid, followed by reduction of all ferric iron to ferrous iron, removal of a part of the iron by crystallization as ferrous sulfate, clarification and adjustment of concentration; the hydrolysate is calcined, together with conditioning agents, to produce the desired white pigment.

The titanium dioxide so produced has been predominantly of anatase crystal structure, one of the three crystal modifications (anatase, brookite, rutile) in which titanium dioxide occurs. The art has known that the rutile structure, on account of its higher refractive index, should have higher hiding power and tinting strength than the anatase structure, but rutile titanium dioxide having better hiding power and tinting strength has not been available commercially because there has been no process for its production at a cost comparable with that of producing anatase.

It is well known that the uncalcined precipitate obtained by the hydrolysis of titanium sulfate has the crystal structure of anatase, which is further developed upon calcination as the combined water and the combined and/or adsorbed acid are expelled. It is also known that the uncalcined precipitate obtained by the hydrolysis of titanium salts of monobasic acids, such as, for example, titanium chloride, has the crystal structure of rutile, which is further developed upon calcination. It is also known that the anatase structure obtained by the hydrolysis of titanium sulfate can be converted to rutile by continued calcination at a very high temperature. Such calcination, however, causes crystal growth and discoloration, which results in a product undesirable for use as a white pigment. No process in which the titanium is precipitated from salts of monobasic acids is economically competitive with the sulfate process, largely because of higher acid cost and the corrosion problems introduced by the use of these monobasic acids.

In co-pending patent application Serial No. 422,104, filed December 8, 1941, it is proposed to convert an anatase precipitate, obtained by the hydrolysis of titanium sulfate solution, to rutile, by first roasting the precipitate in the presence of an alkali metal salt, washing the roasted precipitate substantially free of alkali metal salt, and then calcining in the presence of a small amount of a rutile seed consisting of calcined titanium dioxide, having the crystal structure of rutile, or consisting of an uncalcined precipitate obtained by the hydrolysis of an aqueous solution of a monobasic acid compound of titanium. It is disclosed that the rutile seed may be added either prior to or after the roasting operation.

In co-pending patent application Serial Number 422,082, filed December 8, 1941, it is proposed to convert an anatase precipitate, obtained by the hydrolysis of titanium sulfate solutions, to rutile, by calcining in the presence of a small amount of an alkali metal compound and a small amount of a rutile seed consisting of calcined titanium dioxide having the crystal structure of rutile, or consisting of an uncalcined precipitate obtained by hydrolysis of an aqueous solution of a monobasic acid compound of titanium.

In the co-pending Ross and Tanner application Serial Number 429,118, filed January 31, 1942, there is disclosed an improved method of preparing a rutile conversion seed, by treatment of an alkali metal titanate with limited quantities of a monobasic acid such as hydrochloric or nitric acid, of the order of 20 to 50% of that required to produce the tetra salt.

We have discovered that a substantially improved rutile seed is obtained if a portion of the titanium, prior to the precipitation of the seed (from about 0.1 to 5.0%), is in the titanous form. The pigment obtained by the use of this seed is of greatly improved color as compared with that obtained by the use of a seed prepared in the absence of trivalent titanium.

The trivalent titanium can be made in situ by reduction with zinc, or it can be added in the form of separately prepared titanous salt, such as for example titanous chloride.

We may prepare the alkali metal titanate from any source of titanium dioxide, such as, for example, from hydrated precipitates obtained in the ordinary manufacture of pigment $TiO_2$, by the use of alkaline alkali metal compounds in known manner.

In our preferred procedure, an aqueous pulp of substantially pure hydrated titanium dioxide containing a small amount of combined and/or adsorbed sulfuric acid, obtained by hydrolytic precipitation from a titanium sulfate solution, is treated with an alkaline alkali metal compound such as sodium hydroxide, potassium hydroxide, etc. The hydrated oxide is treated with from about one part to about five parts by weight of sodium hydroxide to one part of anhydrous titanium dioxide, and heated for from about one hour to about six hours at a temperature of about 80° C. to 100° C. About one and one-half parts of sodium hydroxide is a preferred amount. Solid flake sodium hydroxide may be mixed with the concentrated aqueous pulp of the hydrated titanium dioxide, and then heated without further agitation. A concentrated aqueous solution of sodium hydroxide may be mixed with the hydrated titanium dioxide pulp, and heated while continuously stirring. Depending upon the amount of sodium hydroxide used, and also upon the concentration of the sodium hydroxide and hydrated titanium dioxide mixture, the temperature may vary considerably up to and above 100° C., even up to the fusion point, if desired. The reaction may be carried out under atmospheric conditions, or under pressure in an autoclave. To the sodium titanate thus formed, water, which may cause some hydrolysis of the titanate, and consequent formation of hydrated titanium dioxide and/or other titanate or titanates, is added. The solids are washed by decantation and then filtered and washed. The washed solids contain, by analysis after calcination, about 85% titanium dioxide, and about 15% sodium oxide. No attempt is made herein to ascribe any definite composition to the original titanate formed, nor to the solids remaining after treatment with water and washing.

If desired, the hydrated titanium dioxide pulp may be treated with a sufficient amount of an alkaline compound to react with the combined and/or adsorbed sulfuric acid, and then diluted and washed to remove the sulfate prior to treatment with an alkaline alkali metal compound to form a titanate.

The washed solids are treated with hydrochloric acid in sufficient quantity to neutralize the sodium oxide, and in sufficient excess for about 20% to about 50% of theory for the formation of titanium tetrachloride. About 25% of the theoretical quantity for titanium tetrachloride after neutralizing the sodium oxide is preferred. Either after neutralization of the sodium oxide, or after complete neutralization, there is added to the slurry a titanous salt, or a metal such as metallic zinc in sufficient quantity to give the desired amount of titanous chloride; or the titanous chloride is formed in situ by electrolysis. The whole is then diluted with water, and boiled for about one hour. Other monobasic acids may be used in place of hydrochloric acid. The amount of acid used is ordinarily insufficient for complete solution of titanium. The titanium, however, during the boiling period, is transformed to a desirable rutile seed for use in converting anatase structure to rutile structure during calcination. Some such seeds prepared by us have shown by X-ray analysis substantially complete rutile structure.

If desired, the titanate may be treated directly with monobasic acid, thus omitting the water treatment. We prefer to use the water treatment, however, since it eliminates a large amount of the alkali metal, thereby reducing the amount of monobasic acid required, and also removes a large amount of undesirable sodium sulfate. A more active seed is generally obtained if the alkali metal and sulfate ions are largely removed prior to the monobasic acid treatment.

The rutile seed thus formed may be used as such by mixing with an uncalcined hydrated titanium dioxide precipitate, obtained by hydrolytic precipitation from a titanium sulfate solution, at any stage in the process prior to the final washing before calcination, or it may be flocculated by adjusting the slurry to a pH of from about 4.5 to 7.5 by neutralizing with an alkaline reagent such as sodium carbonate, filtered, washed substantially free of chlorides, and then mixed with an uncalcined hydrated titanium dioxide precipitate, obtained by hydrolytic precipitation from a titanium sulfate solution at any stage in the process prior to calcination.

One important advantage of our seed is that it may be used in such a manner as to avoid the conventional separate bleaching operation. In the manufacture of titanium dioxide of anatase crystal structure, the usual procedure is to filter and wash the hydrolysate, bleach by repulping with dilute sulfuric acid and zinc dust, and heating to assist in the removal of heavy metal compounds, and then filter and wash again, prior to mixing with conditioning agents and calcining. Our seed prepared in the presence of trivalent titanium may advantageously be mixed with the hydrolysate after one filtration and washing prior to the bleaching operation, the seed mixing operation and the bleaching operation thus being combined.

Our special rutile seed is extremely finely divided, which probably accounts for its exceptional activity. By its use as a seed, even in relatively small amounts, substantially complete conversion to rutile may be obtained under ordinary calcination conditions. As compared with rutile seeds made in the absence of trivalent titanium, the color of the final pigment is much improved.

The amount of rutile seed used may vary within wide limits. While in general we prefer to use about 5%, based upon the total weight of the titanium dioxide calcined, smaller and larger percentages may be used.

The actual amount of rutile seed used depends upon the quality of the seed, the amount of rutile conversion desired, and also upon the desired other properties of the finished pigment, such as color and softness. The use of 3% or more seed usually induces conversion to rutile at a lower temperature or in a shorter time or both, than when less than 3% seed is used, and thereby produces a pigment of rutile structure which has a color higher in total brightness, and which disperses more readily when ground in vehicles.

It is desired to place no limit upon the rutile conversion obtained. For certain purposes, relatively small conversion may be desired, and in other cases a substantially complete conversion may be desired. For example, it may be desirable to produce a pigment containing 15% rutile and 85% anatase, or a pigment containing 90% rutile and 10% anatase. The hiding power and tinting strength of the pigment produced according to our process increases proportionately as the conversion to rutile increases.

A small amount of an iron salt, such as ferric ammonium sulfate, or a small amount of copper salt, such as copper sulfate, which salts decompose and form the oxides of the metals upon calcination, may be added at some stage prior to calcining to prevent bluing or graying of the color of the pigment during calcination. The preferred amount of iron is from about .01% to about .03%, calculated as $Fe_2O_3$, and based upon the weight of the titanium dioxide. If the uncalcined hydrated titanium dioxide already contains an appreciable amount of iron, the amount added is correspondingly less than the .01% to .03%, so that the calcined pigment will contain from .01% to .03% $Fe_2O_3$. The preferred amount of copper is from .0004% to .002%, calculated as CuO.

Detailed methods for the preparation of our rutile seed are given in Examples 1, 2 and 3.

Example 1

An aqueous pulp of substantially pure hydrated titanium dioxide, containing a small amount of combined and/or adsorbed sulfuric acid, obtained by hydrolytic precipitation from a titanium sulfate solution, and containing 100 grams of titanium dioxide, is diluted with water to about 30%, calcined solids content. To this aqueous slurry is added 150 grams of flake sodium hydroxide, while stirring continuously. The mixture is then heated for about two hours at a temperature of about 85° C. to 90° C., while continuously stirring and at a constant volume. The titanate thus formed is diluted to about 1½ liters with water, washed twice by decantation, then filtered and washed substantially free of sulfates. The filter cake is slurried in 185 cc. of commercial 20° Bé. hydrochloric acid, 4 cc. of a titanous chloride solution containing 100 grams titanous chloride per liter are added, the whole diluted with one liter of water, and boiled at constant volume for about one hour.

Example 2

An aqueous pulp of substantially pure hydrated titanium dioxide, containing a small amount of combined and/or adsorbed sulfuric acid, obtained by hydrolytic precipitation from a titanium sulfate solution, and containing 100 grams of titanium dioxide, is diluted with water to about 30% calcined solids content. To this aqueous slurry is added 150 grams of flake sodium hydroxide, while stirring continuously. The mixture is then heated for about two hours at a temperature of about 85° C. to 90° C., while stirring continuously, and at a constant volume. The titanate thus formed is diluted to about 1½ liters with water, washed twice by decantation, then filtered and washed substantially free of sulfates. The filter cake is slurried in 185 cc. of commercial 20° Bé. hydrochloric acid, 4 cc. of titanous chloride solution containing 100 grams of titanous chloride per liter is added, the whole is diluted with one liter of water, and boiled at constant volume for about one hour. The seed slurry is cooled to 60° C., and adjusted to a pH of 6.0 by the addition of about 340 cc. of 20% solution of sodium carbonate. At this pH the seed is sufficiently flocculated to be filtered. It is filtered and washed substantially free of sodium and chloride ions.

Example 3

An aqueous pulp of substantially pure hydrated titanium dioxide, containing a small amount of combined and/or adsorbed sulfuric acid, obtained by hydrolytic precipitation from a titanium sulfate solution, and containing 100 grams of titanium dioxide, is diluted with water to about 30% calcined solids content. To this aqueous slurry is added 150 grams of flake sodium hydroxide, while stirring continuously. The mixture is then heated for about two hours at a temperature of about 85° C. to 90° C., while stirring continuously, and at a constant volume. The titanate thus formed is diluted to about 1½ liters with water, washed twice by decantation, then filtered and washed substantially free of sulfates. The filter cake is slurried in 185 cc. of commercial 20° Bé. hydrochloric acid, 0.72 gram of metallic zinc dust are added, the whole is diluted with one liter of water, and boiled at constant volume for about one hour.

Having described our invention and given examples illustrating methods for preparing the rutile seed, we now give examples illustrating the conversion of anatase structure to rutile structure.

Example 4

An aqueous pulp of an hydrated titanium dioxide precipitate, readied for calcination and obtained by hydrolytic precipitation from a titanium sulfate solution and containing 200 grams of titanium dioxide, is mixed with 15 grams of the neutralized and washed seed of Example 2 containing 6 grams of titanium dioxide, with 0.24 gram of ferric ammonium sulfate containing .04 gram of ferric oxide and with a concentrated aqueous solution containing 4.1 grams of potassium carbonate. This mixture is dried and roasted for one hour at a temperature of about 850° C. The roasted product is milled and slurried in sufficient water to give a pulp containing 15% solids. 5 cc. of commercial 20° Bé. hydrochloric acid are added, and the solids are filtered out and washed substantially free of sulfates. The washed filter cake is then dried and calcined by slowly raising the temperature from about 300° C. to about 975° C. during about five hours, and then holding at a temperature of about 950° C. to about 1000 C. for about two hours.

The transformation to rutile, as determined by X-ray analysis, has been substantially complete. The tinting strength of the hydroclassified and dry milled pigment is 1720. The color is noticeably better than a similar pigment obtained by the use of a seed containing no titanous salt.

Tinting strength evaluations are based upon an arbitrary scale in which present commercial titanium dioxide of anatase crystal structure has a value of 1250.

Example 5

An aqueous pulp of an hydrated titanium dioxide precipitate prepared for calcination and obtained by hydrolytic precipitation from a titanium sulfate solution, and containing 200 grams of titanium dioxide, is mixed with 0.24 gram of ferric ammonium sulfate containing .04 gram of ferric oxide, and with 4.0 grams of potassium carbonate. The mixture is dried and roasted for one hour at a temperature of about 850° C.

The roasted product is milled and slurried in water. 85 grams of the hydrochloric acid suspension of Example 1, containing 6 grams of titanium dioxide, are added. The mixture is filtered and the filter cake is washed substantially free of alkali metal salts. The filter cake is then dried and calcined by slowly raising the temperature from about 300° C. to about 975° C. during about five hours, and then holding at a temperature of about 975° C. to about 1000° C. for about two hours. The transformation to rutile, as determined by X-ray analysis, has been substantially complete. The tinting strength of the hydroclassified and dry milled pigment is 1720.

*Example 6*

An aqueous pulp of an hydrated titanium dioxide precipitate readied for calcination and obtained by hydrolytic precipitation from a titanium sulfate solution, and containing 200 grams of titanium dioxide, is diluted with water to a calcined solids content of 20%, and mixed with 85 grams of the hydrochloric acid suspension of Example 1, which contains 6 grams of titanium dioxide. The mixture is filtered and washed until the filter cake is substantially free of chlorides. The filter cake is then mixed with a concentrated aqueous solution containing 0.24 gram of ferric ammonium sulfate, which contains .04 gram of ferric oxide, and with a concentrated aqueous solution containing 0.70 gram of potassium carbonate, dried and calcined by slowly raising the temperature from about 300° C. to about 975° C. during about five hours, and then holding at a temperature of about 975° C. to about 1000° C. for about four hours.

The calcined pigment contains by X-ray analysis about 90% rutile. The tinting strength of the hydroclassified and dry milled pigment is 1640.

*Example 7*

A thoroughly washed aqueous pulp of an hydrated titanium dioxide precipitate, obtained by hydrolytic precipitation from a titanium sulfate solution, and containing 200 grams of titanium dioxide, is mixed with 25 grams of the neutralized, filtered and washed seed of Example 2 containing 10 grams of titanium dioxide, and with a concentrated aqueous solution containing 0.70 gram of potassium carbonate and calcined for about two hours at a temperature of about 975° C. to about 1000° C.

The calcined pigment contains by X-ray analysis, about 90% rutile. The tinting strength of the hydroclassified and dry milled pigment is 1640. The color of the product is not quite as good as that of the products obtained in Examples 4, 5 and 6, due to the omission of the iron addition.

*Example 8*

An aqueous pulp of an hydrated titanium dioxide precipitate readied for calcination and obtained by hydrolytic precipitation from a titanium sulfate solution, and containing 200 grams of titanium dioxide, is diluted with water to a calcined solids content of 20%, and mixed with 141 grams of the hydrochloric acid suspension of Example 3, containing 10 grams of titanium dioxide. The mixture is filtered, and the filter cake is washed substantially free of chloride. The filter cake is then mixed with 0.24 gram of ferric ammonium sulfate containing 0.04 gram of ferric oxide, and with a concentrated aqueous solution containing 0.70 gram of potassium carbonate, dried and calcined by slowly raising the temperature from about 300° C. to about 975° C. during about five hours, and then holding at a temperature of about 975° C. to about 1000° C. for about three hours.

The transformation to rutile, as determined by X-ray analysis, has been substantially complete. The tinting strength of the hydroclassified pigment is 1680.

*Example 9*

By increasing the amount of zinc used in Example 3 to 1.44 grams, the conventional bleaching operation may be combined with the seed mixing operation, and thereby avoid one repulping and washing operation. Thus, a hydrolysate such as is described in Example 8 is filtered, washed and repulped to a calcined solids content of about 22%, and 141 grams of the hydrochloric acid suspension of Example 3 (made by using 1.44 grams of zinc) is mixed therewith. 18 grams of commercial 93% sulfuric acid is added, and the mixture stirred for two hours at 65° C. The mixture is filtered and washed substantially free of chlorides and sulfates.

Another method of combining the bleaching operation with the seed mixing operation is to add the seed at the time of the bleaching operation; thus the seed of Example 3 may be added toegther with a solution of titanous sulfate or titanous chloride and the whole heated to 65° C., held at this temperature for about 2 hours, and then filtered and washed.

While a rather definite calcination schedule is indicated in the examples, this schedule may be varied considerably. In actual commercial operation the calcination may be continuous through a rotating horizontal kiln, which is heated at the discharge end, and in which therefore there is a gradual temperature change from one end of the kiln to the other.

Our calcined pigment, obtained in accordance with any of the modifications of the invention, may be either simply dry milled or wet milled, hydroclassified, treated with the usual reagents, filtered, dried and disintegrated in accordance with the present known procedures for producing the commercial titanium dioxide pigments having the anatase crystal structure.

Our finished pigment has many desirable properties, such as good resistance to chalking, excellent resistance to discoloration in white baking enamels, etc., but is characterized in the main by its exceptional hiding power and tinting strength. The hiding power and tinting strength of the product in which the conversion to rutile has been substantially complete is in the neighborhood of 40% higher than that of present commercial titanium dioxide having the anatase crystal structure. When the conversion to rutile has been less, the advantage in hiding power and tinting strength is correspondingly less.

We claim:

1. A process for the preparation of an agent for accelerating the conversion of anatase to rutile, comprising treating an alkali metal titanate with a mono-basic acid in sufficient amount to completely convert the alkali metal content to the salt of the mono-basic acid and to theoretically convert 20–50% of the titanium content to the normal salt of the mono-basic acid, introducing trivalent Ti ions into the mixture as a member of the group consisting of a separately prepared titanous salt and trivalent Ti ions produced in situ by further treatment, and heating the resultant mixture.

2. A process for the preparation of an agent for accelerating the conversion of anatase to rutile, comprising treating an alkali metal titanate with a mono-basic acid in sufficient amount to completely convert the alkali metal content to the salt of the mono-basic acid and to theoretically convert 20–50% of the titanium content to the normal salt of the mono-basic acid, introducing trivalent Ti ions into the mixture by the addition of a metal and an acid, and heating the resultant mixture.

3. A process for the preparation of an agent for accelerating the conversion of anatase to rutile, comprising treating an alkali metal titanate with a mono-basic acid in sufficient amount to completely convert the alkali metal content to the salt of the mono-basic acid and to theoretically convert 20–50% of the titanium content to the normal salt of the mono-basic acid, introducing trivalent Ti ions into the mixture by the addition of a titanous salt, and heating the resultant mixture.

4. A process for the preparation of an agent for accelerating the conversion of anatase to rutile, comprising treating an alkali metal titanate with a mono-basic acid in sufficient amount to completely convert the alkali metal content to the salt of the mono-basic acid and to theoretically convert 20–50% of the titanium content to the normal salt of the mono-basic acid, introducing trivalent Ti ions into the mixture by electrolysis of said mixture, and heating the resultant mixture.

5. A process for the preparation of rutile titanium dioxide from hydrolysates, which normally calcine to anatase, which comprises filtering and washing such hydrolysates, adding to the filter cake an agent for converting anatase to rutile prepared according to the process of claim 1, and acid, heating the mixture to solubilize heavy metal impurities, and thereafter filtering, washing and calcining at a temperature not exceeding 1000° C.

6. A process for the preparation of rutile titanium dioxide from hydrolysates, which normally calcine to anatase, which comprises filtering and washing such hydrolysates, adding to the filter cake an agent for converting anatase to rutile prepared according to the process of claim 1, heating the mixture to solubilize heavy metal impurities, and thereafter filtering, washing and calcining at a temperature not exceeding 1000° C.

7. A seed for accelerating the conversion of anatase to rutile comprising finely divided uncalcined seed crystals prepared by treating an alkali metal titanate with a monobasic acid in amounts sufficient to completely convert the alkali metal content to the salt of the monobasic acid and to theoretically convert 20–50% of the titanium content to the normal salt of the monobasic acid, introducing trivalent titanium ions into the mixture as a member of the group consisting of separately prepared titanous salt and trivalent titanium ions produced in situ by further treatment, and heating the resultant mixture, said seed possessing the crystal structure of rutile.

8. A process for the preparation of rutile titanium dioxide from hydrolysates which normally calcine to anatase which comprises filtering and washing such hydrolysates, adding to the filter cake a seed for converting anatase to rutile prepared by treating an alkali metal titanate with a monobasic acid in sufficient amount to completely convert the alkali metal content to the salt of the monobasic acid and to theoretically convert 20–50% of the titanium content to the normal salt of the monobasic acid, introducing trivalent titanium ions into the mixture as a member of the group consisting of a separately prepared titanous salt and trivalent titanium ions produced in situ by further treatment, heating the resultant mixture, flocculating the resulting slurry by adding an alkali to adjust the pH to about 4.5 to 7.5 and washing free of water-soluble salts, and thereafter filtering, washing and calcining the filter cake containing said seed at a temperature not exceeding 1000° C.

WINFRED J. CAUWENBERG.
CHARLES A. TANNER, Jr.